(12) United States Patent
Tanijiri et al.

(10) Patent No.: US 6,816,132 B2
(45) Date of Patent: Nov. 9, 2004

(54) IMAGE DISPLAY APPARATUS

(75) Inventors: Yasushi Tanijiri, Osakasayama (JP); Hiroaki Ueda, Suita (JP); Kenji Ishibashi, Izumi (JP); Ichiro Kasai, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 311 days.

(21) Appl. No.: 09/843,633

(22) Filed: Apr. 27, 2001

(65) Prior Publication Data

US 2001/0038361 A1 Nov. 8, 2001

(30) Foreign Application Priority Data

Apr. 27, 2000 (JP) ........................................ 2000-127213

(51) Int. Cl.[7] ................................................ G09G 5/00
(52) U.S. Cl. .............................................. 345/7; 345/8
(58) Field of Search ..................... 345/7, 6, 32; 348/43; 351/41; 353/74; 359/15, 834

(56) References Cited

U.S. PATENT DOCUMENTS

| | | | | |
|---|---|---|---|---|
| 5,300,942 A | * | 4/1994 | Dolgoff | 345/32 |
| 5,347,400 A | * | 9/1994 | Hunter | 359/815 |
| 5,543,870 A | * | 8/1996 | Blanchard | 353/74 |
| 5,589,956 A | * | 12/1996 | Morishima et al. | 359/15 |
| 5,825,539 A | * | 10/1998 | Hoshi | 359/462 |
| 6,111,597 A | * | 8/2000 | Tabata | 348/43 |
| 6,177,952 B1 | * | 1/2001 | Tabata et al. | 348/47 |
| 6,185,045 B1 | * | 2/2001 | Hanano | 359/631 |
| 6,335,838 B1 | * | 1/2002 | Kasai et al. | 359/834 |
| 6,344,837 B1 | * | 2/2002 | Gelsey | 345/6 |
| 6,474,809 B2 | * | 11/2002 | Tanijiri et al. | 351/41 |
| 6,614,408 B1 | * | 9/2003 | Mann | 345/8 |

FOREIGN PATENT DOCUMENTS

| | | |
|---|---|---|
| JP | 11-064781 A | 3/1999 |
| JP | 11-064782 A | 3/1999 |

* cited by examiner

Primary Examiner—Amare Mengistu
Assistant Examiner—Prabodh M. Dharia
(74) Attorney, Agent, or Firm—Sidley Austin Brown & Wood LLP

(57) ABSTRACT

An image display apparatus is provided for providing a virtual image to an observer. The image display apparatus includes an image display unit, an eyepiece optical system, and a container. The image display unit is for providing modulated light corresponding to the virtual image. The eyepiece optical system is for directing the modulated light from the image display unit to one or both of the observer's eyes. The container is for supporting the image display unit on an edge portion of the eyepiece optical assembly.

42 Claims, 3 Drawing Sheets

IMAGE DISPLAY APPARATUS

RELATED APPLICATION

This application is based on application No. 2000-127213 filed in Japan, the content of which is hereby incorporated by reference.

1. Field of the Invention

The present invention relates to an image display apparatus that is used in front of a user's face and that provides images that are superimposed over external images.

2. Description of the Prior Art

As information-providing means for personal use, image display apparatuses have been proposed that are mounted in front of a user's face and lead light from a displayed image to the user's eye together with external light so that the displayed image is superimposed over external images. A user can use such an apparatus in a variety of everyday situations, such as observing displayed images while walking.

An apparatus of this kind generally has the configuration of glasses having a frame, a pair of lenses, nose pads and a pair of temples The display device that displays images is housed in a container mounted around the frame. In order for the displayed image to be superimposed on external images, light from the display device, which is located at the side, must be led to a location immediately in front of the eye and the light path must be changed there such that the light strikes the eye from the front. It is also preferred that the images displayed in a small display device be enlarged for observation. For this purpose, a hologram element is used.

For example, Japanese Laid-Open Patent Application Hei 11-64781 discloses an apparatus having a hologram element on a front surface of a lens (i.e., a surface located farther away from the eye). Light from a display device is led into the lens from an edge area of the lens, directly striking the hologram element, and after it is diffracted, it is led to the eye. On the other hand, Japanese Laid-Open Patent Application Hei 11-64782 discloses an apparatus having a hologram element on a rear surface of a lens (i.e., a surface closer to the eye). Here, light from a display device is led to the hologram element from the rear surface of the lens, where it is diffracted without striking the lens and led to the eye.

In these examples, a user observes actual external images together with an enlarged virtual image of the displayed image. However, a part of the external light is blocked by a container or a frame such that an eclipse occurs in the field of view.

The fact that external light is blocked by a container or a frame does not pose a problem for the purpose of providing displayed images. Nevertheless, for safety purposes, as large a field of view as possible must be maintained by reducing the range over which the light is blocked by a container or a frame since the apparatus may be used in a variety of everyday situations.

However, in conventional apparatuses, containers and frames are designed with a principal focus on ease of arrangement of the optical system or increased strength of the apparatus, and their sizes and configurations are not suitable for the purpose of ensuring a large field of view.

SUMMARY OF THE INVENTION

An object of the present invention is to overcome these and other shortcomings in the prior art designs.

Another object of the present invention is to provide an improved image display apparatus.

Another object of the present invention is to provide an image display apparatus in which the range of the field of view blocked by the container for housing the display device or blocked by the frame is small.

These objects are attained by an image display apparatus comprising nose pads that come into contact with a user's nose and a pair of temples that come into contact with a user's ears, sides of head, or rear area of head. The image display apparatus is worn in front of a user's face, such that (i) the apparatus leads light from a displayed image to a user's eye together with external light so that the displayed image is superimposed on external images, (ii) wherein the apparatus includes one or two display units including a display device that displays images, a container that supports the display device, and an eyepiece optical system that leads the light from the display device to the eye and provides a virtual image of the displayed image, and (iii) wherein at least one length of the container that extends in a direction perpendicular to a direction connecting the container and the eye is shorter than the length of the container that extends in the direction connecting the container and the eye.

The display device provides displayed images to at least one eye, and depending on whether one or two display devices are included, the image display apparatus may be an apparatus for one-eyed observation or two-eyed observation. The configuration of the container is such that it is thin in the direction perpendicular to the line of sight when the user looks toward the container. Therefore, the range of field of view that is blocked by the container is small. At the same time, because the container is long in the direction along the above line of view, even when a light source and optical system to illuminate the display device are included in the container, they can be easily arranged therein.

Here, the container should support the display device such that the display surface thereof is essentially perpendicular to the direction connecting the center thereof to the eye. In this way, when a transmission-type display device, which allows the illuminating light to pass through, is used for the display device, the illuminating light source and optical system may be placed along an extension of the straight line connecting the eye and the center of the display surface, so that the light source and optical system may have simple and lightweight constructions without increasing the width of the container.

The above objects are further attained by an image display apparatus comprising nose pads that come into contact with a user's nose and a pair of temples that come into contact with a user's ears, sides of head, or rear area of head. The image display apparatus is worn in front of a user's face, wherein (i) the apparatus leads light from a displayed image to a user's eye together with external light such that the displayed image is superimposed on external images, (ii) the apparatus includes one or two display units including a display device that displays images, a container that supports the display device, and an eyepiece optical system that leads light from the display device to the eye and provides a virtual image of the displayed image, and (iii) the container is configured such that an angle over which a user's field of view is blocked is determined by a part of the container closer than the center thereof to the eye in a direction connecting the container and the eye.

When the container has this configuration, a range of the blocked field of view may be reduced relative to a different configuration, and the container itself may be reduced in size, making the apparatus more lightweight. For example, if the angle over which the field of view is blocked is determined by a part of the container that is closer than the center thereof to the eye and a part of the container that is farther than the center thereof away from the eye, the range of the blocked field of view increases; if the angle over which the field of view is blocked is determined by a part of the container that is farther than the center thereof away from the eyes, the container increases in size.

A prism may be included in each of the above image display apparatuses, wherein such prism is located in front of the eye, allows external light pass through, and leads the external light to the eye; a part thereof also operates as an eyepiece optical system that leads light from the display device to the eye.

When at least a part of the eyepiece optical system is located in the field of view, it may affect the external light that passes therethrough in some way and may cause distortion or discontinuity in external images provided to the user. By including a prism that also operates as an eyepiece optical system, so that the prism has the same effect as an eyepiece optical system with regard to the external light that does not pass through an eyepiece optical system, or so that the effect of an eyepiece optical system is offset by the prism, the occurrence of distortion and discontinuity in the external images may be avoided. In addition, by mounting the container, nose pads, and temples to the prisms, a connecting member such as a frame to integrate these members may no longer be needed.

The above objects are also attained by an image display apparatus comprising nose pads that come into contact with a user's nose and a pair of temples that come into contact with a user's ears, sides of head, or rear area of head. The image display apparatus is worn in front of a user's face, wherein (i) the apparatus leads light of a displayed image to a user's eye together with external light such that the displayed image is superimposed on external images, (ii) the apparatus includes one or two display units including a display device that displays images, a container that supports the display device, and an eyepiece optical system that leads light from the display device to the eye and provides a virtual image of the displayed image, and (iii) because the prisms are mounted to the nose pad assembly and the temples and the container or containers are mounted to the prisms, a connecting member such as a frame to integrate the container or containers, nose pad assembly and temples is not needed.

In this apparatus, a connecting member such as a frame to integrate the container, nose pads and temples is not needed, such that the field of view is not blocked by a connecting member.

A part of each prism of this apparatus should also operate as an eyepiece optical system such that light from the display device is led to the eye. In doing so, as described above, the occurrence of distortion and discontinuity in external images may be avoided.

In the image display apparatus having the above prisms, the container or containers are located around the prism or prisms and each prism may have a construction in which it has, as an eyepiece optical system, a surface that leads light from the display device to the interior of the prism, a surface that reflects several times inside the prism the light thus led to the interior of the prism and leads it close to the eye, and a surface that directs the light led to a location immediately in front of the eye toward the eye. Because light from the display device is reflected inside the prism and is led to a location immediately in front of the eye, the container may be located around or outside of the field of view, resulting in a larger field of view. In addition, the prism may be made thinner.

The surface that directs the light led to a location immediately in front of the eye should comprise a hologram element. In doing so, the prism can lead both the light from the display device and the external light to the eye without light loss, and the display image or external images superimposed on the display image do not become dark, even while the apparatus maintains a simple construction.

The prisms should have magnification powers by which to correct a diopter. In this way, a user with weak vision can also clearly observe the external world without using other correcting means.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
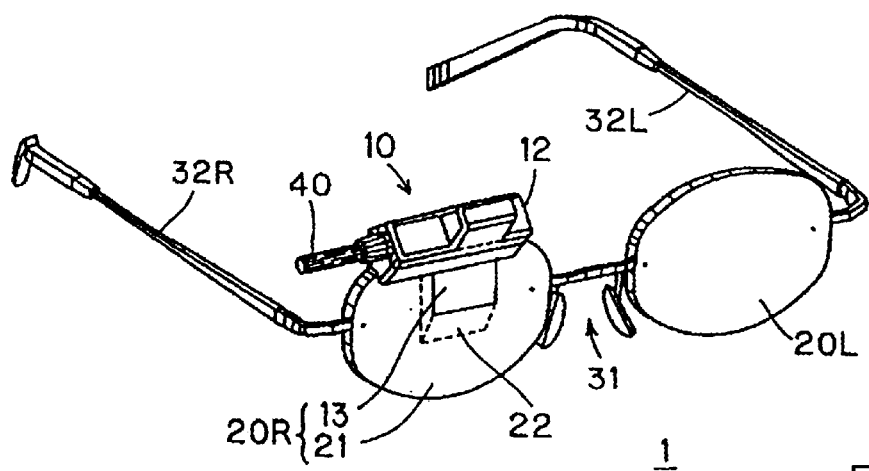
FIG. 1 is a perspective view of an image display apparatus of a first embodiment.

The embodiments of the image display apparatus of the present invention are explained below with reference to the drawings. FIG. 1 shows the external view of an image display apparatus 1 of a first embodiment. The image display apparatus 1 comprises a display unit 10, a pair of left and right prisms 20L and 20R, a nose pad assembly 31, and a pair of left and right temples 32L and 32R, and is worn in front of the face of a user such that the prisms 20L and 20R are located in front of the left and right eyes, respectively.

The nose pad assembly 31 is mounted to the prisms 20L and 20R and connect them. The temples 32L and 32R are mounted to the end areas of the prisms 20L and 20R, respectively. When the apparatus is worn, the nose pad assembly 31 rests on the nose, and the temples 32L and 32R rest on the ears, the sides of the head, or the rear area of the head, such that the image display apparatus 1 is supported by these three members. The temples 32L and 32R may be rotated around vertical axes (not shown in the drawing) located near the prisms 20L and 20R, respectively, such that they may be folded inward during non-use.

Figure 2:
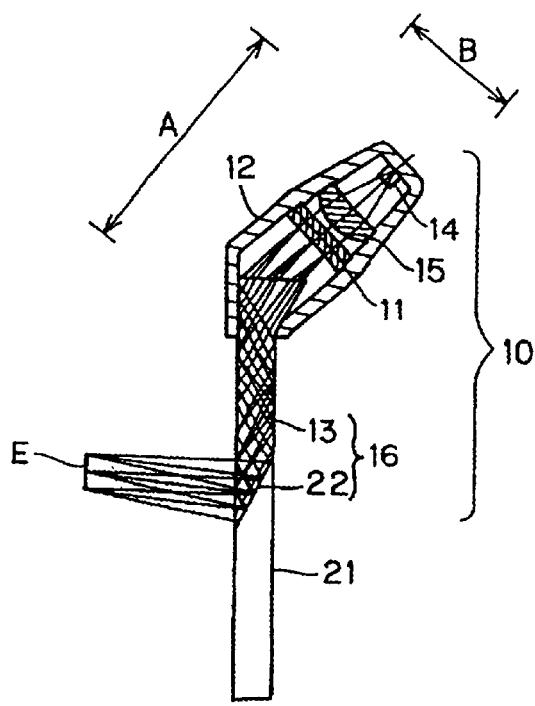
FIG. 2 is a cross-sectional view including the display device of the image display apparatus of the first embodiment.

The display unit 10 is mounted to the right prism 20R. FIG. 2 shows the cross-section thereof including the display unit 10. The display unit 10 comprises a transmission-type liquid crystal display device (LCD) 11, a container 12, a prism 13, a light emitting diode (LED) 14, and a lens 15. The LCD 11 displays an image to be provided to the user and the illuminating light is modulated by the displayed image The container 12 houses and supports the LCD 11, the LED 14, and the lens 15. The LED 14 is a light source to illuminate the LCD 11, and the lens 15 is an illuminating optical system to lead in a uniform fashion the light emitted by the LED 14 to the entire surface of the LCD 11.

The image displayed by the LCD 11 and the light emitted by the LED 14 are controlled by a controller (not shown in the drawings) located outside the image display apparatus 1. The controller is connected to the container 12 by a cable 40, as shown in FIG. 1, and supplies power and image signals through the cable 40.

The prism 13 has a flat plate configuration, and is made of clear glass or resin. The prism 13 leads light from the LCD 11 to the eye E of the user, and provides a virtual image of the image displayed on the LCD 11. The upper end area of the prism 13 has a wedge configuration in which the end area is thicker than the inner side, and the container 12 is mounted to the prism 13 such that it sandwiches the wedge-shaped upper end area. The prism 20L has a flat plate configuration and comprises a single member. The prism 20R also has a flat plate configuration, but comprises the prism 13 and a prism 21, instead of just a single member. The prisms 20L and 21 are made of the same material as the prism 13, and there is no difference in the index of refraction among these three prisms. The prisms 13 and 21 that comprise the prism 20R have mutually compensating configurations and are glued together such that they have no substantial gap in between and their surfaces are contiguous. Except for a wedge-shaped upper end area of the prism 13, the prisms 20L and 20R are symmetrical. The user wearing the image display apparatus 1 in front of his or her face observes the external world through the prisms 20L and 20R.

The lower end area of the prism 13 is constructed such that it has a wedge configuration wherein the front surface (the surface farther away from the eye E) approaches the rear surface (the surface closer to the eye E) toward the lower end. The front surface of this wedge-shaped part, i.e., the surface that connects to the prism 21, is a flat surface, and a hologram element 22 is formed on this surface. The hologram element 22 becomes located immediately in front of the eye E when the apparatus is worn. The prism 13 and the hologram element 22 comprise an eyepiece optical system 16.

The prism 13 leads light located in the interior thereof from the LCD 11 via an end surface of the upper end area of the prism 13 to the hologram element 22 while conducting total reflection via the front and rear surfaces of the prism 13 several times. The hologram element 22 diffracts the thus led light, converts it to essentially parallel light, and causes it to strike the eye E. As a result, a virtual image of the image displayed on the LCD 11 is provided to the user. The hologram element 22 operates only minimally on external light, so that the virtual image is observed to be superimposed over the center of external images.

The hologram element 22 is designed such that the distance from the eye E to the virtual image will appear to be one to three meters and the size of the virtual image will appear to be several times to several tens of times larger than the real image displayed on the LCD 11. Therefore, the image provided to the user is easy to observe. The user can clearly observe the displayed image and external images through a simple slight adjustment of the focal point of the eye E.

In the image display apparatus 1, light from the LCD 11 is led to the hologram element 22 while it is reflected inside the prism 13, and therefore the prism 20R may be made large in size. As a result, the container 12 may be located around or outside the field of view of the eye E, minimizing the range of the field of view blocked by the container 12. In addition, because most of the external light passes through the prism 20R and strikes the eye E, image distortion or color bleeding does not occur in the external images except for extreme edge areas. Moreover, since the width of the prism 20R may be made small, around three millimeters for example, the entire apparatus becomes lightweight.

The lower end area of the prism 13 has a wedge configuration, but because it is connected to the prism 21, which is made of the same material as the prism 13, no refraction occurs with regard to the external light that passes through the lower end area of the prism 13. Therefore, the center area of the external images does not experience distortion or discontinuity, and the image display apparatus 1 can provide high quality images.

The LCD 11 has a rectangular configuration that is horizontally long, and is capable of displaying one to several lines of character strings comprising less than 20 characters aligned horizontally. Consequently, the user can obtain a large amount of information from the displayed image at once.

The container 12 is designed such that its length A that extends in the direction that connects the eye E and the container 12 is approximately twice as long as the length B that extends in the direction perpendicular to the above direction and the horizontal direction. Therefore, the container 12 is thin and the range of the field of view blocked by the container 12 is small. The LCD 11 is located such that its display surface becomes perpendicular to a straight line that connects the eye E and the center of the display surface thereof, and the lens 15 and LED 14 are located along a line extending from the above straight line. Based on this construction, while the container 12 is thin, the LCD 11, the lens 15, and the LED 14 may be easily arranged inside of it, and an illuminating optical system may be constructed in a simple fashion using the lens 15 only.

Figure 3:
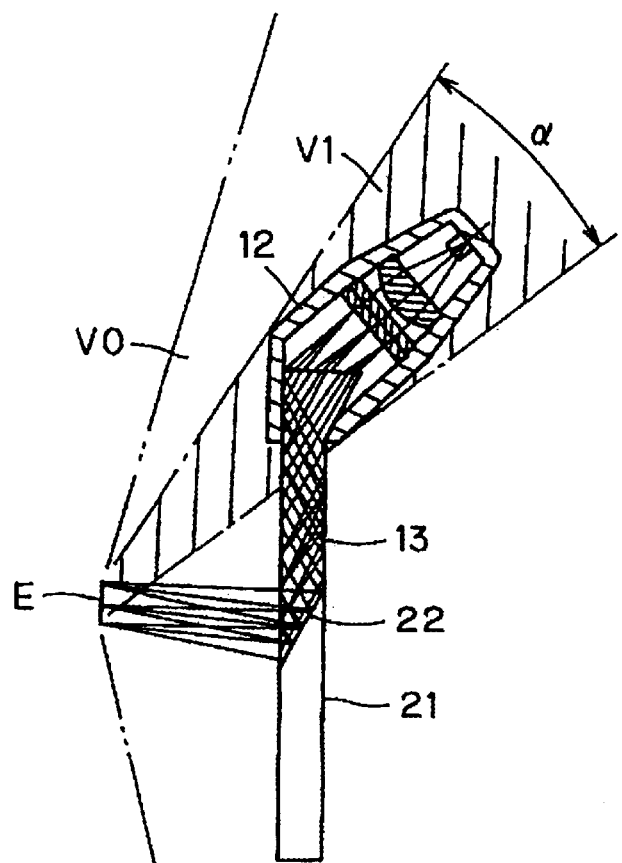
FIG. 3 is a cross-sectional view of an example of a user's field of view and a range of the field of view blocked by the container in the image display apparatus of the first embodiment.

FIG. 3 shows an example of the field of view of the eye E and the range of the field of view blocked by the container 12. This example shows a case in which the entire container 12 is located within a field of view V0. The range of the field of view V1, which is a portion of the field of view V0 blocked by the container 12, is small. As described above, it is also possible to locate a part of the container 12 outside the field of view V0, so that is possible to further reduce the range of field of view blocked by the container 12.

The container 12 has a configuration such that an angle α over which the field of view is blocked is determined only by a part of the container that is closer to the eye E than the center thereof in terms of a direction connecting the eye E and the container 12. Because the container 12 is thin, the range of field of view blocked by the container 12 is small; thus, this configuration enables the range of the blocked field of view to be further reduced and the container 12 to be made lightweight. If the angle over which the field of view is blocked were to be determined by a part of the container closer to the eye E than the above center and a part of the container farther away from the eye E than the above center, even if the container has a similar configuration, the range of the blocked field of view would increase. If the angle over which the field of view is blocked were to be determined only by a part of the container farther away from the eye E than the above center, the container 12 would increase in size and weight.

In this embodiment, the displayed image is provided to the right eye, but naturally it is acceptable if the displayed image is provided to the left eye instead.

Figure 4:
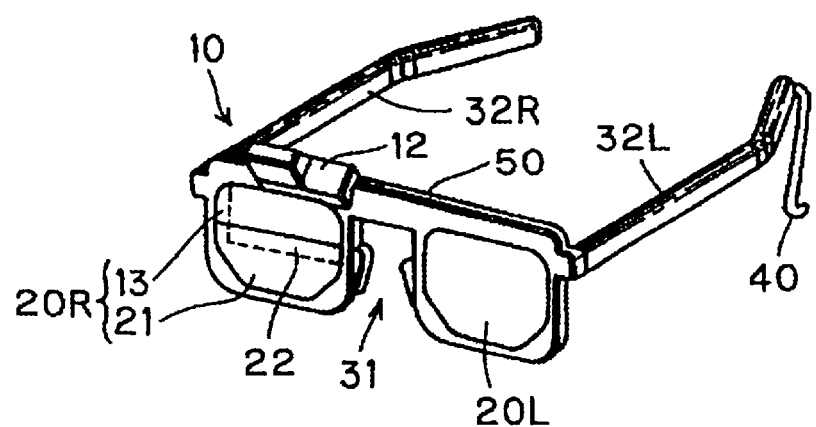
FIG. 4 is a perspective view of an image display apparatus of a second embodiment.

FIG. 4 shows the external view of an image display apparatus 2 of a second embodiment. The image display apparatus 2 comprises the above image display device 1 plus a frame 50, such that the container 12, the prisms 20L and 20R, the nose pad assembly 31 and the temples 32L and 32R are mounted to the frame 50. While the width (the horizontal length) of the prism 13 was approximately one-third that of the prism 21 in the image display apparatus 1, in the image display apparatus 2, the width of the prism 13 is the same as the width of the prism 21.

Figure 5:
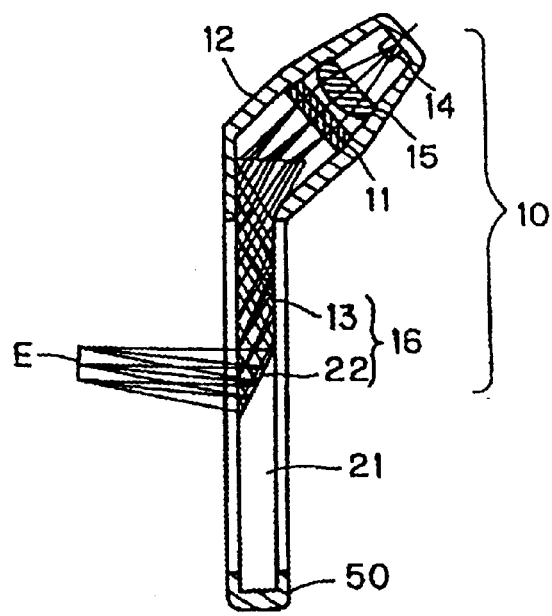
FIG. 5 is a cross-sectional view including the display device of the image display apparatus of the second embodiment.

Using this construction, while the range of the blocked field of view increases due to the existence of the frame 50, a wide image may be provided. The configuration of the container 12 and the constructions and functions of the prism 13 and hologram element 22 comprising an eyepiece optical system 16, and of the prism 21, are the same as in the image display apparatus 1, as shown in the cross-sectional view of FIG. 5. The cable 40 that connects the apparatus with the controller is attached to the rear end of the temple 32L, and is connected to the container 12 through the inside of the temple 32L and the frame 50.

Figure 6:
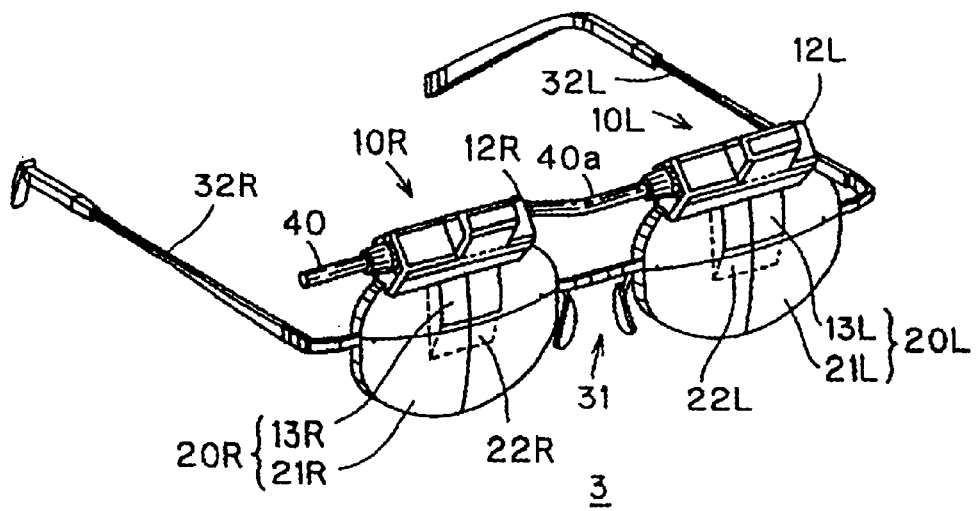
FIG. 6 is a perspective view of an image display apparatus of a third embodiment.

FIG. 6 shows an external view of an image display apparatus 3 of a third embodiment. The image display apparatus 3 includes a pair of display units 10L and 10R such that an image may be provided to both eyes, and includes prisms 20L and 20R provided with magnification powers such that the apparatus can correct the vision of the user. The construction of each of the display units 10L and 10R is the same as the construction of the display unit 10 of the image display apparatus 1 of the first embodiment, except that the prisms 13L and 13R are curved. The container 12R is connected to the controller via the cable 40, and the container 12L is connected to the controller via the cable 40a, the container 12R and the cable 40.

The magnification powers of the prisms 20L and 20R are set in accordance with the vision of the user. By providing the prisms 20L and 20R with negative magnification powers, the apparatus can correct nearsightedness, and by providing them with positive magnification powers, the apparatus can correct farsightedness. The lower end surfaces of the prisms 13L and 13R that connect with the prisms 21L and 21R, respectively, are flat surfaces, so that hologram elements 22L and 22R may be easily formed thereon.

In the image display apparatus of an embodiment that includes one or two display units each including a display device that displays images, a container that supports the display device, and an eyepiece optical system that leads the light from the display device to the eye and provides a virtual image of the displayed image, wherein at least one length of the container that extends in the direction perpendicular to the direction connecting the container and the eye is smaller than the length of the container that extends in the direction connecting the container and the eye, the container may be made small, so that the range of field of view blocked by the container is small. Therefore, a highly safe apparatus may be obtained. In addition, a light source and optical system to illuminate the display device may be easily incorporated in the container.

Where the container supports the display device such that the display surface thereof is essentially perpendicular to the direction that connects the center of the display surface and the eye, even if a simple and relatively inexpensive transmission-type display device is used, the illuminating light source and optical system may be arranged with few limitations, and the container may be reliably made thin. Moreover, because the illuminating light source and optical system can be simple and lightweight in construction, the resulting apparatus may be small, lightweight and comfortable to use.

In the image display apparatus of the present invention that includes one or two display units including a display device that displays images, a container that supports the display device, and an eyepiece optical system that leads light from the display device to the eye and provides a virtual image of the displayed image, wherein the container has a configuration such that the angle over which the field of view is blocked is determined only by a part of the container closer than the center thereof to the eye in the direction connecting the container and the eye, the field of view blocked by the container is small, resulting in a highly safe apparatus as well.

Where the apparatus includes a prism that allows external light to pass through and leads it to the eye, and part of the prism operates as an eyepiece optical system and leads light from the display device to the eye, the occurrence of distortion and discontinuity in the external images caused by the eyepiece optical system may be avoided, and the user feels no discomfort. Moreover, because the container, nose pads, and temples may be mounted to the prism, a connecting member such as a frame used to integrate these members is no longer necessary, and the range of the blocked field of view may be further reduced.

In the image display apparatus of an embodiment that includes one or two display units including a display device that displays images, a container that supports the display device, and an eyepiece optical system that leads light from the display device to the eye and provides a virtual image of the displayed image, and a pair of prisms that are located in front of the eyes allow external light to pass through and lead it to the left and right eyes, wherein the prisms are mounted to the nose pad assembly and the temples and the container or containers are mounted to the prisms, a connecting member such as a frame used to integrate the container or containers, nose pad assembly and temples is not needed. Therefore, the field of view is not blocked by a connecting member, resulting in a highly safe apparatus. In addition, the apparatus becomes lightweight and is comfortable to use.

Because a part of each prism works as an eyepiece optical system and leads light from the display device to the eye, the occurrence of distortion and discontinuity in external images due to the effect of the eyepiece optical system may be avoided in this apparatus as well, and natural images may be provided to the user.

Where the container is mounted around the prism, and the prism has surfaces which include a surface that leads light from the display device to the interior thereof, a surface that reflects several times inside the prism the light thus led to the interior thereof and leads it close to the eye, and a surface that directs the light thus led to a location immediately in front of the eye, and these surfaces comprise an eyepiece optical system, the container may be located around or outside the field of view, resulting in a larger field of view and higher safety. Moreover, the prism may be made thin, resulting in a lightweight apparatus.

Where the surface that directs toward the eye the light led to a location immediately in front of the eye comprises a hologram element, both the light from the display device and the external light may be led to the eye without light loss, so that all of the displayed image and external images may be viewed with sufficient brightness. In addition, the construction is simple and easy to manufacture.

Where the prisms are given magnification powers to correct the diopter, the apparatus can function as vision-correcting glasses, and a user with weak vision can clearly observe the external world.

Although the present invention has been fully described by way of example with reference to the accompanying drawings, it is understood that various changes and modifications will be apparent to those skilled in the art. Therefore, unless such changes and modifications depart from the scope of the present invention, they should be construed as being included therein.

What is claimed is:

1. An image display apparatus for providing a virtual image to an observer, the image display apparatus comprising:
   an image display unit for providing modulated light corresponding to the virtual image;
   an eyepiece optical assembly for directing the modulated light from the image display unit to a first eye of the observer, said image display apparatus providing external light to the observer; and
   a container for supporting the image display unit, said container projecting in a direction of the observer's view,
   wherein at least one length of the container extending in a direction perpendicular to a direction connecting the container and the observer's first eye is shorter than a length of the container that extends in a direction connecting the container and the observer's first eye; and
   wherein the virtual image is superimposed over an external image provided to the observer by the image display apparatus.

2. An image display apparatus in accordance with claim 1, further comprising a cable assembly for inputting an image signal to the image display unit.

3. An image display apparatus in accordance with claim 1, wherein the eyepiece optical assembly includes a lens member, a prism, and a hologram element sandwiched between the lens member and the prism, wherein the prism directs the modulated light from the image display unit to the hologram element and on to the observer's first eye.

4. An image display apparatus in accordance with claim 3, wherein the lens member included with the optical assembly has a magnification power set in accordance with a vision of the observer's first eye.

5. An image display apparatus in accordance with claim 3, wherein the image display unit includes a light source, a lens for collimating light from the light source, and a liquid crystal display for modulating the collimated light from the lens.

6. An image display apparatus in accordance with claim 1, wherein the image display unit includes a light source, a lens for collimating light from the light source, and a liquid crystal display for modulating the collimated light from the lens.

7. An image display apparatus in accordance with claim 1, further comprising:
   a second image display unit for providing modulated light corresponding to the virtual image;
   a second eyepiece optical assembly for directing the modulated light from the second image display unit to a second eye of the observer; and
   a second container for supporting the second image display unit, said second container projecting in a direction of the observer's view,
   wherein at least one length of the second container extending in a direction perpendicular to a direction connecting the second container and the observer's second eye is shorter than a length of the second container that extends in a direction connecting the second container and the observer' second eye.

8. An image display apparatus in accordance with claim 7, wherein the second eyepiece optical assembly includes a lens member, a prism, and a hologram element sandwiched between the lens member and the prism, wherein the prism directs light from the second image display unit to the hologram element and on to the observer' second eye.

9. An image display apparatus in accordance with claim 7, wherein the second image display unit includes a light source, a lens for collimating light from the light source, and a liquid crystal display for modulating the collimated light from the lens.

10. An image display apparatus in accordance with claim 1, wherein the container is mounted to an edge portion of the eyepiece optical assembly.

11. An image display apparatus in accordance with claim 1, further comprising:
    a nosepad assembly for supporting the image display apparatus on the observer' nose; and
    a pair of temples for supporting the image display apparatus, coming into contact with the observer' ears, a side of the observer' head or a rear area of the observer' head.

12. An image display apparatus for providing a virtual image to an observer, the image display apparatus comprising:
    an image display unit for providing modulated light corresponding to the virtual image;
    an eyepiece optical assembly for directing the modulated light from the image display unit to a first eye of the observer, said image display apparatus providing external light to the observer; and
    a container for supporting the image display unit, said container projecting in a direction of the observer' view,
    wherein the container is configured such that an angle over which an observer' first eye' field of view is blocked is determined by a part of the container closer than the center thereof to the observer' first eye in a direction connecting the container and the observer' first eye; and
    wherein the virtual image is superimposed over an external image provided to the observer by the image display apparatus.

13. An image display apparatus in accordance with claim 12, further comprising a cable assembly for inputting an image signal to the image display unit.

14. An image display apparatus in accordance with claim 12, wherein the eyepiece optical assembly includes a lens member, a prism, and a hologram element sandwiched between the lens member and the prism, wherein the prism directs light from the display device to the hologram element and on to the observer' first eye.

15. An image display apparatus in accordance with claim 14, wherein the lens member included with the optical assembly has a magnification power set in accordance with a vision of an observer' first eye.

16. An image display apparatus in accordance with claim 14, wherein the image display unit includes a light source, a lens for collimating light from the light source, and a liquid crystal display for modulating the collimated light from the lens.

17. An image display apparatus in accordance with claim 12, wherein the image display unit includes a light source, a lens for collimating light from the light source, and a liquid crystal display for modulating the collimated light from the lens.

18. An image display apparatus in accordance with claim 10, further comprising:
   a second image display unit for providing modulated light corresponding to the virtual image;
   a second eyepiece optical assembly for directing the modulated light from the second image display unit to a second eye of the observer; and
   a second container for supporting the second image display unit, said second container projecting in a direction of the observer'view,
   wherein the second container is configured such that an angle over which an observer'second eye'field of view is blocked is determined by a part of the second container closer than the center thereof to the observer'second eye in a direction connecting the container and the observer'second eye.

19. An image display apparatus in accordance with claim 18, wherein the second eyepiece optical assembly includes a lens member, a prism, and a hologram element sandwiched between the lens member and the prism, wherein the prism directs light from the second image display unit to the hologram element and on to the observer'second eye.

20. An image display apparatus in accordance with claim 18, wherein the second image display unit includes a light source, a lens for collimating light from the light source, and a liquid crystal display for modulating the collimated light from the lens.

21. An image display apparatus in accordance with claim 12, wherein the container is mounted to an edge portion of the eyepiece optical assembly.

22. An image display apparatus in accordance with claim 12, further comprising:
   a nosepad assembly for supporting the image display apparatus on the observer'nose; and
   a pair of temples for supporting the image display apparatus, coming into contact with the observer'ears, a side of the observer'head or a rear area of the observer'head.

23. An image display apparatus for providing a virtual image to an observer, the image display apparatus comprising:
   an image display unit for providing modulated light corresponding to the virtual image;
   a nose pad assembly for supporting the image display apparatus on an observer'nose;
   a frameless eyepiece optical assembly for directing the modulated light from the image display unit to a first eye of the observer, the frameless eyepiece optical assembly having a first prism that transmits external light and directs light from the image display unit and the external light to the observer'first eye, the first prism being mounted to the nose pad assembly;
   a container for supporting the image display unit mounted to the first prism; and a pair of temples for supporting the image display apparatus, coming into contact with the observer'ears, a side of the observer'head or a rear area of the observer'head, one of the temples being mounted to the first prism of the frameless eyepiece optical assembly.

24. An image display apparatus in accordance with claim 23, further comprising a cable assembly for inputting an image signal to the image display unit.

25. An image display apparatus in accordance with claim 23, wherein the first prism comprises a second prism and a third prism, the frameless eyepiece optical assembly further comprising a hologram sandwiched between the second prism and the third prism.

26. An image display apparatus in accordance with claim 23, wherein the first prism included with the optical assembly has a magnification power set in accordance with a vision of the observer'first eye.

27. An image display apparatus in accordance with claim 25, wherein the image display unit includes a light source, a lens for collimating light from the light source, and a liquid crystal display for modulating the collimated light from the lens.

28. An image display apparatus in accordance with claim 23, wherein the image display unit includes a light source, a lens for collimating light from the light source, and a liquid crystal display for modulating the collimated light from the lens.

29. An image display apparatus in accordance with claim 23, further comprising:
   a second image display unit for providing modulated light corresponding to the virtual image;
   a second frameless eyepiece optical assembly for directing the modulated light from the second image display unit to a second eye of the observer the second frameless eyepiece optical assembly having a fourth prism that transmits external light and directs light from the second image display unit and the external light to the observer'second eye, the fourth prism being mounted to the nose pad assembly; and
   a second container for supporting the second image display unit mounted to the fourth prism, wherein one of the two temples which is not mounted to the first prism is mounted to the fourth prism.

30. An image display apparatus in accordance with claim 29, wherein the fourth prism comprises a fifth prism and a sixth prism, the second frameless eyepiece optical assembly further comprising a hologram sandwiched between the fifth prism and the sixth prism.

31. An image display apparatus in accordance with claim 29, wherein the second image display unit includes a light source, a lens for collimating light from the light source, and a liquid crystal display for modulating the collimated light from the lens.

32. A head-mounted display for providing a virtual image to an observer, the head-mounted display comprising:
   an image display unit for providing modulated light corresponding to the virtual image;
   an eyepiece optical assembly for directing the modulated light from the image display unit to a first eye of the observer, wherein the eyepiece optical assembly has a first edge portion and a second edge portion opposite the first edge portion;
   a container for supporting the image display unit mounted to an edge portion of the eyepiece optical assembly which extends between the first edge portion and the second edge portion; and
   at least one temple for contacting a side of the observer'head, the temple being mounted to the first edge portion of the eyepiece optical assembly,
   wherein at least one length of the container extending in a direction perpendicular to a direction connecting the container and the observer'first eye is shorter than a length of the container that extends in a direction connecting the container and the observer'first eye.

33. A head-mounted display in accordance with claim 32, further comprising:

a second image display unit for providing modulated light corresponding to the virtual image;

a second eyepiece optical assembly for directing the modulated light from the second image display unit to a second eye of the observer, wherein the second eyepiece optical assembly has a first edge portion and a second edge portion opposite the first edge portion;

a second container for supporting the second image display unit mounted to an edge portion of the second eyepiece optical assembly which extends between the first edge portion and the second edge portion; and a second temple for contacting a second side of the observer'head, the second temple being mounted to the first edge portion of the second eyepiece optical assembly.

34. A head-mounted display in accordance with claim 33, further comprising a frame member fixed to the eyepiece optical assembly and fixed to the second eyepiece optical assembly such that the frame member extends along a perimeter of the eyepiece optical assembly and along a perimeter of the second eyepiece optical assembly.

35. A head-mounted display in accordance with claim 33, further comprising a nosepad assembly fixed to the second edge portion of the eyepiece optical assembly and fixed to the second edge portion of the second eyepiece optical assembly.

36. A head-mounted display for providing a virtual image to an observer, the head-mounted display comprising:

an image display unit for providing modulated light corresponding to the virtual image;

an eyepiece optical assembly for directing the modulated light from the image display unit to a first eye of the observer, wherein the eyepiece optical assembly has a first edge portion and a second edge portion opposite the first edge portion;

a container for supporting the image display unit mounted to an edge portion of the eyepiece optical assembly which extends between the first edge portion and the second edge portion; and at least one temple for contacting a side of the observer'head, the temple being mounted to the first edge portion of the eyepiece optical assembly, wherein the container is configured such that an angle over which an observer'first eye'field of view is blocked is determined by a part of the container closer than the center thereof to the observer'first eye in a direction connecting the container and the observer'first eye.

37. A head-mounted display in accordance with claim 36, further comprising:

a second image display unit for providing modulated light corresponding to the virtual image;

a second eyepiece optical assembly for directing the modulated light from the second image display unit to a second eye of the observer, wherein the second eyepiece optical assembly has a first edge portion and a second edge portion opposite the first edge portion;

a second container for supporting the second image display unit mounted to an edge portion of the second eyepiece optical assembly which extends between the first edge portion and the second edge portion; and a second temple for contacting a second side of the observer'head, the second temple being mounted to the first edge portion of the second eyepiece optical assembly.

38. A head-mounted display in accordance with claim 37, further comprising a frame member fixed to the eyepiece optical assembly and fixed to the second eyepiece optical assembly such that the frame member extends along a perimeter of the eyepiece optical assembly and along a perimeter of the second eyepiece optical assembly.

39. A head-mounted display in accordance with claim 38, further comprising a nosepad assembly fixed to the second edge portion of the eyepiece optical assembly and fixed to the second edge portion of the second eyepiece optical assembly.

40. A head-mounted display for providing a virtual image to an observer, the head-mounted display comprising:

an image display unit for providing modulated light corresponding to the virtual image;

a frameless eyepiece optical assembly for directing the modulated light from the image display unit to a first eye of the observer, wherein the frameless eyepiece optical assembly has a first edge portion and a second edge portion opposite the first edge portion;

a container for supporting the image display unit mounted to an edge portion of the frameless eyepiece optical assembly which extends between the first edge portion and the second edge portion; and at least one temple for contacting a side of the observer'head, the temple being mounted to the first edge portion of the frameless eyepiece optical assembly.

41. A head-mounted display in accordance with claim 40, further comprising:

a second image display unit for providing modulated light corresponding to the virtual image;

a second frameless eyepiece optical assembly for directing the modulated light from the second image display unit to a second eye of the observer, wherein the second frameless eyepiece optical assembly has a first edge portion and a second edge portion opposite the first edge portion;

a second container for supporting the second image display unit mounted to an edge portion of the second frameless eyepiece optical assembly which extends between the first edge portion and the second edge portion; and a second temple for contacting a second side of the observer'head, the second temple being mounted to the first edge portion of the second frameless eyepiece optical assembly.

42. A head-mounted display in accordance with claim 41, further comprising a nosepad assembly fixed to the second edge portion of the frameless eyepiece optical assembly and fixed to the second edge portion of the second frameless eyepiece optical assembly.

* * * * *

UNITED STATES PATENT AND TRADEMARK OFFICE
CERTIFICATE OF CORRECTION

PATENT NO. : 6,816,132 B2
DATED : November 9, 2004
INVENTOR(S) : Yasushi Tanijiri et al.

It is certified that error appears in the above-identified patent and that said Letters Patent is hereby corrected as shown below:

Column 10
Line 24, delete "observer'nose", insert -- observer's nose --.
Line 26, delete "observer'ears", insert -- observer's ears --.
Lines 27 and 28, delete "observer'head", insert -- observer's head --.
Lines 42, 44, 46, 58 and 62, delete "observer'first", insert -- observer's first --.
Line 42, delete "eye'field", insert -- eye's field --.

Column 11,
Line 15, delete "observer'view", insert -- observer's view --.
Lines 17, 20, 21 and 26, delete "observer'second", insert -- observer's second --.
Line 17, delete "eye'field", insert -- eye's field --.
Lines 38 and 50, delete "observer'nose", insert -- observer's nose --.
Lines 40 and 61, delete "observer'ears", insert -- observer's ears --.
Lines 41, 42, 61 and 62 delete "observer'head", insert -- observer's head --.
Line 56, delete "observer'first", insert -- observer's first --.

Column 12,
Lines 9, 65 and 67, delete "observer'first", insert -- observer's first --.
Line 30, delete "observer'second", insert -- observer's second --.
Line 61, delete "observer'head", insert -- observer's head --.

Column 14
Lines 4, 34 and 54, delete "observer'head", insert -- observer's head --.

Signed and Sealed this

Fourteenth Day of March, 2006

JON W. DUDAS
*Director of the United States Patent and Trademark Office*